United States Patent
Maij et al.

(10) Patent No.: US 9,688,490 B2
(45) Date of Patent: Jun. 27, 2017

(54) MOTION COMPENSATION DEVICE AND METHOD FOR TRANSFERRING A LOAD

(71) Applicant: Barge Master IP B.V., Capelle A/D Ijssel (NL)

(72) Inventors: Eelko Maij, Wateringen (NL); Jim Koppenol, Rotterdam (NL)

(73) Assignee: Barge Master IP B.V., Capelle A/D Ijssel (NL)

( * ) Notice: Subject to any disclaimer, the term of this patent is extended or adjusted under 35 U.S.C. 154(b) by 0 days.

(21) Appl. No.: 14/765,140

(22) PCT Filed: Feb. 5, 2013

(86) PCT No.: PCT/NL2013/050061
§ 371 (c)(1),
(2) Date: Jul. 31, 2015

(87) PCT Pub. No.: WO2014/123407
PCT Pub. Date: Aug. 14, 2014

(65) Prior Publication Data
US 2015/0360887 A1  Dec. 17, 2015

(51) Int. Cl.
*B63B 27/10* (2006.01)
*B65G 67/62* (2006.01)
(Continued)

(52) U.S. Cl.
CPC .............. *B65G 67/62* (2013.01); *B63B 27/10* (2013.01); *B66C 13/02* (2013.01); *G05B 19/404* (2013.01);
(Continued)

(58) Field of Classification Search
CPC . B66C 13/02; B63B 27/10; B63B 2017/0072; E21B 19/006
(Continued)

(56) References Cited

U.S. PATENT DOCUMENTS

RE27,261 E * 12/1971 Bromell et al. ........ B63B 29/12
114/122
4,200,054 A * 4/1980 Elliston .................. E02F 9/067
114/264
(Continued)

FOREIGN PATENT DOCUMENTS

KR   10-2011-0012898 A    2/2011
WO      2010/114359 A1   10/2010
WO      2011/013883 A1    3/2011

*Primary Examiner* — Gregory Adams
(74) *Attorney, Agent, or Firm* — Hoffmann & Baron, LLP

(57) ABSTRACT

The invention concerns a method for transferring a load between a target position on board a vessel (40) and an outboard position outboard said vessel. The invention further concerns a motion compensation device (1) applying the method. In the method the load is being transferred by a crane (30) carried by a motion compensation device arranged on board the vessel. The motion compensation device comprises a carrier frame (2), a base (3) and an actuator system (8, 9) for moving the carrier frame with respect to the base; the base being fixed to the vessel and the crane being carried by the carrier frame. During picking up a load from the vessel or placing a load on the vessel, the actuator system is being driven in an on board mode such that the carrier frame is being compensated for x-axis rotational movement and y-axis rotational movement of the vessel, and follows, viewed in the vertical direction, the vertical movement of the target location. During picking up a load from the outboard position or placing a load on the outboard position, the actuator system is being driven in an outboard mode such that the carrier frame is being compensated for x-axis rotational movement, y-axis rotational movement and z-axis translational movement of the vessel.

19 Claims, 3 Drawing Sheets

(51) Int. Cl.
 B66C 13/02 (2006.01)
 G05B 19/404 (2006.01)
 B63B 17/00 (2006.01)
(52) U.S. Cl.
 CPC ............ *B63B 2017/0072* (2013.01); *B65G 2814/0397* (2013.01); *G05B 2219/31445* (2013.01); *G05B 2219/45046* (2013.01)
(58) Field of Classification Search
 USPC ............ 108/4; 114/122, 191, 192; 166/355; 212/195, 319; 244/110 E; 248/550; 414/138.2, 138.3, 139.5, 139.6, 139.7, 414/142.7, 728, 744.3, 744.4; 701/21; 74/490.08, 490.09, 490.13; 901/18, 22
 See application file for complete search history.

(56) References Cited

U.S. PATENT DOCUMENTS

| | | | | |
|---|---|---|---|---|
| 4,354,608 A * | 10/1982 | Wudtke | ............... | B66C 13/02 212/256 |
| 4,448,396 A * | 5/1984 | Delago | ............... | B66D 1/52 254/340 |
| 4,662,786 A * | 5/1987 | Cherbonnier | ............... | B63B 35/44 114/264 |
| 5,154,561 A * | 10/1992 | Lee | ............... | B63B 27/12 114/264 |
| 6,505,574 B1 * | 1/2003 | Naud | ............... | B63B 27/10 114/268 |
| 6,659,703 B1 * | 12/2003 | Kirkley | ............... | B63B 27/10 414/138.2 |
| 6,836,707 B2 * | 12/2004 | Sowada | ............... | G01C 21/165 114/230.1 |
| 7,152,547 B1 * | 12/2006 | Hovland | ............... | B63B 17/00 114/261 |
| 7,367,464 B1 * | 5/2008 | Agostini | ............... | B66C 13/063 212/308 |
| 8,195,368 B1 * | 6/2012 | Leban | ............... | B66C 13/063 212/277 |
| 2003/0123957 A1 * | 7/2003 | Jordan | ............... | E21B 19/006 414/138.2 |
| 2009/0232625 A1 * | 9/2009 | Almeda, Jr. | ............... | B66C 23/52 414/139.6 |
| 2010/0230370 A1 * | 9/2010 | Schneider | ............... | B63B 27/10 212/276 |
| 2011/0011320 A1 * | 1/2011 | Yemington | ............... | B63B 35/44 114/122 |
| 2011/0155034 A1 * | 6/2011 | Kwak | ............... | B63B 39/005 114/124 |

\* cited by examiner

MOTION COMPENSATION DEVICE AND METHOD FOR TRANSFERRING A LOAD

CROSS-REFERENCE TO RELATED APPLICATIONS

This application is the National Stage of International Application No. PCT/NL2013/050061 filed Feb. 5, 2013, the contents of which is incorporated by reference herein.

FIELD OF THE INVENTION

The present invention relates in general to a motion compensation device for compensating a load transfer manipulator—which might for example be a crane—on a vessel for local water motion.

BACKGROUND OF THE INVENTION

WO 2010/114359 describes a motion compensation device of the same applicant as the present application. In WO 2010/114359 the carrier frame is compensated for x-axis rotational movement, y-axis rotational movement as well as z-axis translational movement due to water motion. Taking into account that the crane is carried on the carrier frame, this also compensates the crane. According to WO 2010/114359 there is an actuator system comprising at least three cylinder-piston-units, which are arranged essentially parallel, especially essentially vertical. In use these cylinder-piston units can be extended or shortened simultaneously to adjust the vertical height—in z-axis direction—of the carrier frame with respect to the vessel. During use, when a vessel is essentially stationary on its place this is the dominant vessel movement to be compensated for when the vessel goes up and down with the—often relatively slow and long—wave movement of the water. The less dominant sideways roll of the vessel and aft-front pitch of the vessel are compensated for by adjusting the same cylinder-piston-units differently with respect to each other. WO 2010/114359 describes a constraining system restricting x-axis translational movement, y-axis translational movement and z-axis rotational movement of the carrier frame with respect to the base to movements necessary to allow for z-axis translational movement, x-axis rotational movement and y-axis rotational movement of the carrier frame with respect to the base by said actuator system. The concept behind WO 2010/114359 is that in most cases, it suffices to compensate only for z-axis translational movement, x-axis rotational movement and y-axis rotational movement of the vessel. The other three degrees of freedom of movement of the vessel (i.e. the z-axis rotational movement, the x-axis translational movement and the y-axis translational movement) need not be compensated for because they are under many circumstances negligible. These other three degrees of freedom of movements being negligible can have different reasons. When, for example, the vessel is anchored and/or kept in position by a dynamic positioning control, these other degrees of freedom of movement are already being taken care of. Although the present invention is not limited to this concept of WO 2010/114359, the present invention might be applied with this same concept.

In WO 2010/114359 the compensation aims at maintaining the carrier frame in a non-changing position with respect to the fixed world. This is very helpful when a crane, provided on a vessel moving due to local water motion, is used to deliver a load onto a construction on shore or fixed in the sea bed or to pick up a load from such a construction. However, when using such a motion compensation device for compensating a crane which is picking up a load from the vessel on which the crane itself is supported, the crane and vessel will move with respect to each other as the carrier frame supporting the crane is maintained motionless with respect to the fixed world whilst the vessel is moving with respect to the fixed world. Consequently picking up a load from the deck of the vessel and placing a load on the deck of the vessel is impeded by relative motion, causing dynamic and snatch loads creating unsafe situations.

SUMMARY OF THE INVENTION

More specifically, the present invention relates to a motion compensation device for compensating a load manipulator, such as a crane, on a vessel for water motion wherein an imaginary set of three orthogonal axes is defined by an x-axis, a y-axis and a z-axis, the z-axis extending vertically when the device is in use;
wherein the device comprises:
  a carrier frame for carrying the manipulator;
  a base for supporting the motion compensation device on the vessel;
  an actuator system adapted to cause upon actuation of the actuator system one or more of the following movements:
    translation of the carrier frame with respect to the base along the z-axis;
    rotation of the carrier frame with respect to the base around the x-axis;
    rotation of the carrier frame with respect to the base around the y-axis;
  a sensor system arranged for sensing at least x-axis rotational movement and y-axis rotational movement of the vessel and generating sensor signals representing said sensed movements of the vessel;
  a control system generating one or more control signals driving the actuator system in response to said sensor signals;
wherein the control system comprises an outboard control mode for outboard load manipulation; wherein, in the outboard control mode, the control system is arranged to generate one or more control signals for driving the actuator system such that the carrier frame is compensated for x-axis rotational movement, y-axis rotational movement and z-axis translational movement of the vessel.

The invention further relates to an assembly comprising such a motion compensation device according to the invention and a crane, which assembly might further comprise a vessel as well.

The invention further relates to an assembly comprising such a motion compensation device according to the invention and a vessel, which assembly preferably comprises a crane as well. Worded differently, the present invention thus also relates to a vessel provided with a motion compensation device according to the invention, which vessel preferably is provided with a crane as well.

The invention also relates to a method for transferring a load from a target position on board of a vessel to an outboard position outboard of said vessel, or vice versa.

When transferring loads from a vessel to another vessel or to some other construction, which might be movable or unmovable relative to the ground, problems arise due to movement of the water on which the vessel floats. Motion of the water subjects the load transfer device, and consequently the load to be transferred, to similar movements. In case the load is carried by a hoisting cable, the water motion will cause a swinging movement of the load as well.

Also when the weather conditions are very calm, the above mentioned problems due to local water movement are present. In this respect it is to be noted that although evidently the water is brought into motion strongly by wind, the effects of wind can lag for weeks in water and have influence on water at large distance away from the location of the wind. Even the water might look like very calm, but still being in motion due to wind weeks ago and/or far away. The effect of this on for example marine building operations is that one has to wait for the water to be almost motionless, in case for example a crane with hoisting cable is to be used safely.

With respect to the motions to which a vessel on water is subjected, it is to be noted that a vessel is in fact subject to 6 degrees of freedom of movement, three translational movements and three rotational movements. Using a mathematical approach based on a carthesian coordinate system having an imaginary set of three orthogonal axes—an x-axis, y-axis and z-axis—these 6 movements can be called x-axis translational movement, y-axis translational movement, z-axis translational movement, x-axis rotational movement, y-axis rotational movement and z-axis rotational movement. It is to be noted, that from a mathematical point of view there are also other equivalent manners to define the 6-degrees of movement in a space, for example the 3 axes used might not be orthogonal with respect to each other or a so called spherical coordinate system might be used. It is just a matter of mathematical calculation to transfer one definition of 6 degrees of freedom of movement into another definition of 6 degrees of freedom of movement. Using the so called carthesian coordinate system and defining the z-axis as extending vertically, the x-axis as extending in longitudinal direction of a vessel and the y-axis as extending in transverse direction of a vessel, the x-axis translational movement is in practise called surge
the y-axis translational movement is in practise called sway
the z-axis translational movement is in practise called heave
the x-axis rotational movement is in practise called roll
the y-axis rotational movement is in practise called pitch The above terms surge, sway, heave, roll, pitch and yaw all are dynamic in the sense that these might vary from moment to moment depending on the movements of the water. On top of this comes that the vessel might not be aligned horizontal—also not in absence of any motion of the water—for example due to uneven load distribution or wind influences. In that situation there might be a static deviation with respect to the x-axis rotation and y-axis rotation. The static deviation with respect rotation around the x-axis is called 'list' and the static deviation with respect to the y-axis rotation is called 'trim'. the z-axis rotational movement is in practise called yaw.

The present invention has as its object to provide a motion compensation device which overcomes the above issues of WO 2010/114359.

This object is achieved by providing a motion compensation device for compensating a load manipulator, such as a crane, on a vessel for water motion wherein an imaginary set of three orthogonal axes is defined by an x-axis, a y-axis and a z-axis, the z-axis extending vertically when the device is in use;
wherein the device comprises:
  a carrier frame for carrying the manipulator;
  a base for supporting the motion compensation device on the vessel;
  an actuator system adapted to cause upon actuation of the actuator system one or more of the following movements:
    translation of the carrier frame with respect to the base along the z-axis;
    rotation of the carrier frame with respect to the base around the x-axis;
    rotation of the carrier frame with respect to the base around the y-axis;
  a sensor system arranged for sensing at least x-axis rotational movement and y-axis rotational movement of the vessel and generating sensor signals representing said sensed movements of the vessel;
  a control system generating one or more control signals driving the actuator system in response to said sensor signals;
wherein the control system comprises an outboard control mode for outboard load manipulation;
wherein, in the outboard control mode, the control system is arranged to generate one or more control signals for driving the actuator system such that the carrier frame is compensated for x-axis rotational movement, y-axis rotational movement and z-axis translational movement of the vessel;
which motion compensation device is according to the invention characterised,
in that the control system further comprises on board control mode for on board load manipulation;
in that, in the on board control mode, the control system is arranged to generate one or more control signals for driving the actuator system such that the carrier frame
  is compensated for x-axis rotational movement and y-axis rotational movement of the vessel; and
  follows, viewed in vertical direction, the vertical movement of a target location on the vessel.

According to the invention, the carrier frame is, in the outboard control mode, compensated relative to the outboard location from where a load is to be picked up or where a load is to be delivered. This means that the carrier frame is compensated for at least the x-axis rotational movement, y-axis rotational movement and z-axis translational movement of the vessel. In case the outboard position is motionless with respect to the fixed world, this comes down to maintaining the carrier frame motionless with respect to the fixed world.

Further, according to the invention, in the on board control mode, the x-axis rotational movement and y-axis rotational movement are maintained motionless with respect to the fixed world—so that the crane supported on it is motionless except for motions caused by the crane itself or its operator—on the one hand, whilst, viewed in vertical direction, the carrier frame follows the vertical movement of the target location on (deck of) the vessel. All this comes down to keeping the distance between the carrier frame and target location under control, like maintaining it a constant distance. Consequently, when picking up a load from or placing a load onto the target position on (the deck of) the vessel, the crane is—except for motions caused by the crane or crane operator—motionless with respect to the target location. Thus, picking up a load from or placing a load onto the vessel becomes very easy.

An imaginary set of three orthogonal axes, defined by an x-axis, an y-axis and an z-axis, means that the x-axis and y-axis are mutually perpendicular, and the z-axis being perpendicular with respect to both the x-axis and y-axis.

Both in the on board control mode and in the out board control mode, the motion compensation device according to the invention is able to compensate for roll, list, pitch and trim of the carrier frame. This compensation might according to the invention be with respect to the fixed world.

With respect to the sensor system arranged for sensing at least x-axis rotational movement and y-axis rotational movement, it is noted that:

this sensor system might also sense the z-translational movement of the vessel and generate a sensor signal representing this z-translational movement;

and/or this sensor system might be provided on the base, which undergoes the same movement as the vessel;

this sensor system might in addition or alternatively also be provided on the carrier frame.

According to a further embodiment of the device according to the invention, the compensation of the carrier frame for x-axis rotational movement and y-axis rotational movement of the vessel is, in the outboard control mode and/or on board control mode, such that the carrier frame is maintained in horizontal position.

According to a further embodiment of the device according to the invention, the one or more control signals for driving the actuator system are, in the on board control mode, such that the vertical distance between the target location and carrier frame is maintained at a constant value.

According to a further embodiment of the device according to the invention, the device further comprises a switch connected with the control system for switching the control system between the outboard control mode and on board control mode. This switch, which can be a manual one or an automatic switch, allows switching from one control mode to the other and vice versa.

According to a further embodiment of the device according to the invention, the control system further comprises a transition mode in which the control system switches gradually or smoothly between the on board control mode and the outboard control mode. For example, the transition can take place by fading in and out in a period of for example 10 seconds.

According to a further embodiment of the device according to the invention, the device further comprises a sensor arranged to sense the position of the gripper and to transfer a signal corresponding with the sensed position to the control system, wherein the control system is adapted to:

switch from the outboard control mode to the on board control mode when the gripper comes within a predefined area around the vessel;

switch from the on board control mode to the out board control mode when the gripper leaves a predefined area around the vessel.

This sensor can for example measure or sense the slew angle and/or angle of the crane boom with respect to the horizontal. It is also conceivable to provide the gripper of the crane, for example a crane hook, with a sensor sensing the position of the gripper with respect to the fixed world.

According to a further embodiment of the device according to the invention, the device comprises an input device arranged for receiving coordinates of the target location and transferring these coordinates to the control system. On the basis of these coordinates, the control system can, on the basis of the x-axis and y-axis rotational movement of the vessel easily determine the z-axis translational movement of the target position relative to the base of the motion compensation device. This determination is subsequently used by the control system to drive the actuator system so that the carrier frame follows the target position. In case the target position is predetermined, such an input device might not be needed as these coordinates are simply programmed in the control system.

According to a further embodiment of the device according to the invention, the device comprises a mechanical constraining system restricting or preventing x-axis translational movement, y-axis translational movement and z-axis rotational movement of the carrier frame with respect to the base. In accordance with the concept behind WO 2010/114359, this considerably simplifies the control of a motion compensation device.

According to a further embodiment of the device according to the invention, the device further comprises:

a z-translation unit; and a xy-rotation unit;

wherein the z-translation unit allows z-axis translational movement and prevents x-axis translational movement, y-axis translational movement, z-axis rotational movement, x-axis rotational movement and y-axis rotational movement;

wherein the z-translation unit has, viewed in the direction of the z-axis, a first end and a second end;

wherein the xy-rotation unit allows x-axis rotational movement as well as y-axis rotational movement and prevents z-axis rotational movement, x-axis translational movement, y-axis translational movement, and z-axis translational movement;

wherein the base is provided at the first end of the z-translation unit and the carrier frame at the second end of the z-translation unit with the xy-rotation unit being arranged between the z-translation unit and the carrier frame;

or the z-translation unit and the base;

such that the carrier frame and base are:

on the one hand, moveable with respect to each other in a translational direction along the z-axis, in a rotational direction around the x-axis and in a rotational direction around the y-axis; and on the other hand, restrained from mutual movement in a translational direction along the x-axis, in a translational direction along the y-axis and in a rotational direction around the z-axis;

wherein the actuator system comprises:

at least one z-actuator provided in the z-translation unit and arranged to cause, upon actuation of said z-actuator, z-axis translational movement of the carrier frame with respect to the base; and at least two xy-actuators provided in the xy-rotation unit and arranged to cause, upon actuation of one or more of said xy-actuators, x-axis rotational and/or y-axis rotational movement of the carrier frame with respect to the base; and wherein the at least one z-actuator and at least two xy-actuators are different actuators.

This embodiment allows the z-actuator to be operated without influencing the carrier frame with respect to the x-axis and y-axis rotational movement. In other words the control of the z-axis translation is independent from the control of the x-axis and y-axis rotation of the carrier frame. This embodiment will further be called the 'independent control embodiment' of the invention.

The z-axis translation unit thus has one DOF (=degree of freedom) in the z-axis translational direction. The other five DOF of the z-axis translation unit are fixated. Similarly, the xy-rotation unit has two DOF, the x-axis rotation and the y-axis rotation. The other 4 DOF of the xy-rotation unit are fixated.

By arranging a single z-translation unit and a single xy-rotation unit, from a functional perspective, aligned on the z-axis, it becomes possible to decouple the compensation for z-axis translation from the compensation for xy-axis translation, i.e. movement of the z-actuator can be done without influencing the xy-axis rotation of the carrier frame and movement of the xy-actuators can be done without influencing the z-axis translation. This enables a considerably simpler control of said actuators and allows a design with a much smaller footprint.

Supposing that, viewed in vertical direction, the base is arranged at the lower side of the motion compensation device and the carrier frame at the upper side of the motion compensation device, there are, according to the invention, basically two configurations of the 'independent control embodiment' possible:
  a first configuration with, in vertical direction, sequentially: the base, the z-translation unit, the xy-rotation unit and the carrier frame; and
  a second configuration with, in vertical direction, sequentially: the base, the xy-rotation unit, z-translation unit and the carrier frame.

An imaginary set of three orthogonal axes, defined by an x-axis, an y-axis and an z-axis, means that the x-axis and y-axis are mutually perpendicular, and the z-axis being perpendicular with respect to both the x-axis and y-axis. The z-axis can be defined as a fixed vertical axis immovable with respect to the surrounding, but it can also be defined as another vertical, like a vertical immovable with respect to the vessel.

According to a further embodiment of the 'independent control embodiment', the z-translation unit comprises a first and second part mutually connected by a linear guide system extending in the z-direction, which linear guide system is arranged to allow the first and second part to shift in z-direction with respect to each other and to prevent x-axis translational movement, y-axis translational movement, x-axis rotational movement, y-axis rotational movement and z-axis rotational movement of the first part with respect to the second part.

According to a further embodiment of the 'independent control embodiment', the first and second part are telescopic parts. The first and second part might be tubular having a circular cross section or a cross section with different shape, like square or triangular. Such a telescopic construction can be made very resistant against moments around the x-axis, y-axis and z-axis.

According to a further embodiment of the 'independent control embodiment', the xy-rotation unit comprises a main universal joint attached to the z-translation unit, on the one hand, and to the carrier frame respectively the base, on the other hand. In this application a 'universal joint' is a joint allowing rotational movement around two perpendicular axes. The two parts joined by the universal joint thus are allowed to rotate with respect to each other around two perpendicular axes, whilst any translation with respect to each other and rotation with respect to the third rotational axis is prohibited. Three examples of such a joint are a cardan joint, a ball joint and spherical joint with two degrees of freedom.

According to a further embodiment of the 'independent control embodiment', said at least one z-actuator and/or said at least two xy-actuators are hydraulically or electrically driven.

According to a further embodiment of the 'independent control embodiment', said at least one z-actuator and/or said at least two xy-actuators comprise a cylinder-piston assembly and/or a spindle. The cylinder-piston assembly might be of hydraulic type, especially in case of large forces and short response times. A spindle might be driven electrically or otherwise.

According to a further embodiment of the 'independent control embodiment', said at least two xy-actuators are linear; wherein the proximal end of each said linear actuator is attached to the z-translation unit by a proximal universal joint, whilst the distal end of each said linear actuator is attached to the carrier frame respectively base by a distal universal joint. The terms proximal and distal are used in relation to the z-translation unit, i.e. the end closest to the z-translation unit is proximal, whilst the other end is distal. According to this embodiment, the linear direction of the linear actuators can—in rest condition—be essentially parallel to the z-axis. But note on the one hand that, as the xy-actuators have at their ends universal joints, it will be clear that during use the angle between the linear direction and the z-direction will vary depending on the condition of the respective actuator, and on the other hand that also in rest condition the linear direction of the linear actuators might slant with respect to the z-axis. For example it is conceivable that the linear direction of the linear actuators extend perpendicular to the z-direction and that the linear movement is transferred by means of a link mechanism into a vertical movement. In case the linear xy-actuators comprise one or more actuators having their linear direction in the x-direction and one or more actuators having their linear direction in the y-direction, it becomes possible to control the x-axis rotational movement independently from (i.e. without influencing) the y-axis rotational movement, on the one hand, and to control the y-axis rotational movement independently from (i.e. without influencing) the x-axis rotational movement. For this, the xy-actuators require to set of linear actuators extending perpendicular with respect to each other in a plane perpendicular to the z-axis.

With respect to the term 'universal joint' it is repeated that, according to this application, this is a joint allowing rotational movement around two perpendicular axes. The two parts joined by the universal joint thus are allowed to rotate with respect to each other around two perpendicular axes, whilst any translation with respect to each other is prohibited. Three examples of such a joint are a cardan joint, a spherical bearing and a ball joint. In relation to the x-axis, y-axis and z-axis as used to define the invention, the two perpendicular axes of the distal/proximal 'universal joint' might be the x-axis and y-axis or any other similar pair of orthogonal axes.

According to a further embodiment of the 'independent control embodiment', the maximum stroke of the z-actuators of the z-translation unit is at least 4×, such as at least 10× or at least 15×, as large as the maximum stroke of said linear actuators of the xy-rotation unit. Taking into account that in practise the heave motions—which might be meters—are large with respect to the roll and pitch motions—which typically are up to about 10 degrees for many situations—, this embodiment allows on the one hand effective compensation of both heave and roll/pitch, and on the other hand a slim design with a small footprint.

According to a further embodiment of the 'independent control embodiment', the diameter of the base is in the range of 15× to 50× the maximum stroke of said linear actuators of the xy-rotation unit. This ensures a footprint which is relatively small.

According to a further embodiment of the 'independent control embodiment', the device further comprises a sensor system for sensing z-axis translational movement, x-axis rotational movement, y-axis rotational movement of the base (vessel) and/or carrier frame and generating sensor signals representing said movements.

According to a further embodiment of the 'independent control embodiment', the device further comprises a control system generating control signals for driving the z-actuator and/or one or more of said xy-actuators in response to said sensor signals such that the position of the carrier frame is compensated for said sensed movements.

With respect to the dimensions of the 'independent control embodiment' of the invention, the following characteristic values are mentioned by way of example for illustrative purposes:
the diameter of the base is at most 7 m, such as at most 5 m or at most 4 m;
and/or;
the maximum stroke of the at least one z-actuator is at least 150 cm, such as at least 200 cm;
and/or
the maximum stroke of the at least two xy-actuators is at most 40 cm, such as at most 30 cm or at most 20 cm.

Although the preceding is quite detailed about the so called 'independent control embodiment', it is noted that the invention is equally well applicable to devices not according to the 'independent control embodiment', for example a device like disclosed in WO 2010/114359 having 3 degrees of freedom or a motion compensation device having more or less than 3 degrees of freedom (DOF).

According to a further aspect, the present invention has as its object to provide a method for transferring a load between a target position on board a vessel and an outboard position outboard said vessel, which method similarly as the motion compensation device according to the invention, overcomes the earlier discussed difficulty with on board picking up or placing down a load.

According to the invention this object is achieved by providing a method for transferring a load between a target position on board a vessel and an outboard position outboard said vessel;
wherein the load is being transferred by a crane carried by a motion compensation device arranged on board the vessel;
wherein the motion compensation device comprises a carrier frame, a base and an actuator system for moving the carrier frame with respect to the base; the base being fixed relative to the vessel and the crane being carried by the carrier frame;
wherein, during picking up a load from the vessel or placing a load on the vessel, the actuator system is being driven in an on board mode such that the carrier frame:
is being compensate for x-axis rotational movement and y-axis rotational movement of the vessel; and
follows, viewed in vertical direction, the vertical movement of the target location;
wherein, during picking up a load from the outboard position or placing a load on the outboard position, the actuator system is being driven in an out board mode such that the carrier frame:
is being compensated for x-axis rotational movement, y-axis rotational movement and z-axis translational movement of the vessel.

According to a further embodiment of the method according to the invention, the actuator system is, during picking up a load from the vessel or placing a load on the vessel as well as during picking up a load from the outboard position or placing a load on the outboard position, being driven in such a manner that the carrier frame is maintained in horizontal position.

According to a further embodiment of the method according to the invention, the actuator system is, during picking up a load from the vessel or placing a load on the vessel being driven in such a manner that the vertical distance between the target location and the carrier frame is maintained at a constant value.

According to a further embodiment of the method according to the invention, the actuator system is, during transfer of the load between the target position on board to the vessel and the outboard position the mode of driving, switched:
from the on board mode to the outboard mode in case the transfer is towards the outboard position; or
from the outboard mode to the on board mode in case the transfer is towards the target position.

According to a further embodiment of the method according to the invention, the motion compensation device is driven to switch gradually between the on board control mode and the outboard control mode.

According to a further embodiment of the method according to the invention the motion compensation device is driven to
switch from the outboard control mode to the on board control mode when the gripper comes within a predefined area around the vessel; and
switch from the on board control mode to the out board control mode when the gripper leaves a predefined area around the vessel.

It is to be noted that the term 'movement' as used in this application is to be understood to encompass displacement and/or velocity and/or acceleration. A sensor sensing a movement thus might sense a displacement, a velocity, an acceleration and/or any combination of two or more of these entities.

BRIEF DESCRIPTION OF THE DRAWINGS

The present invention will be described further with reference to the enclosed drawings, in which.

DETAILED DESCRIPTION OF THE INVENTION

Figure 1:
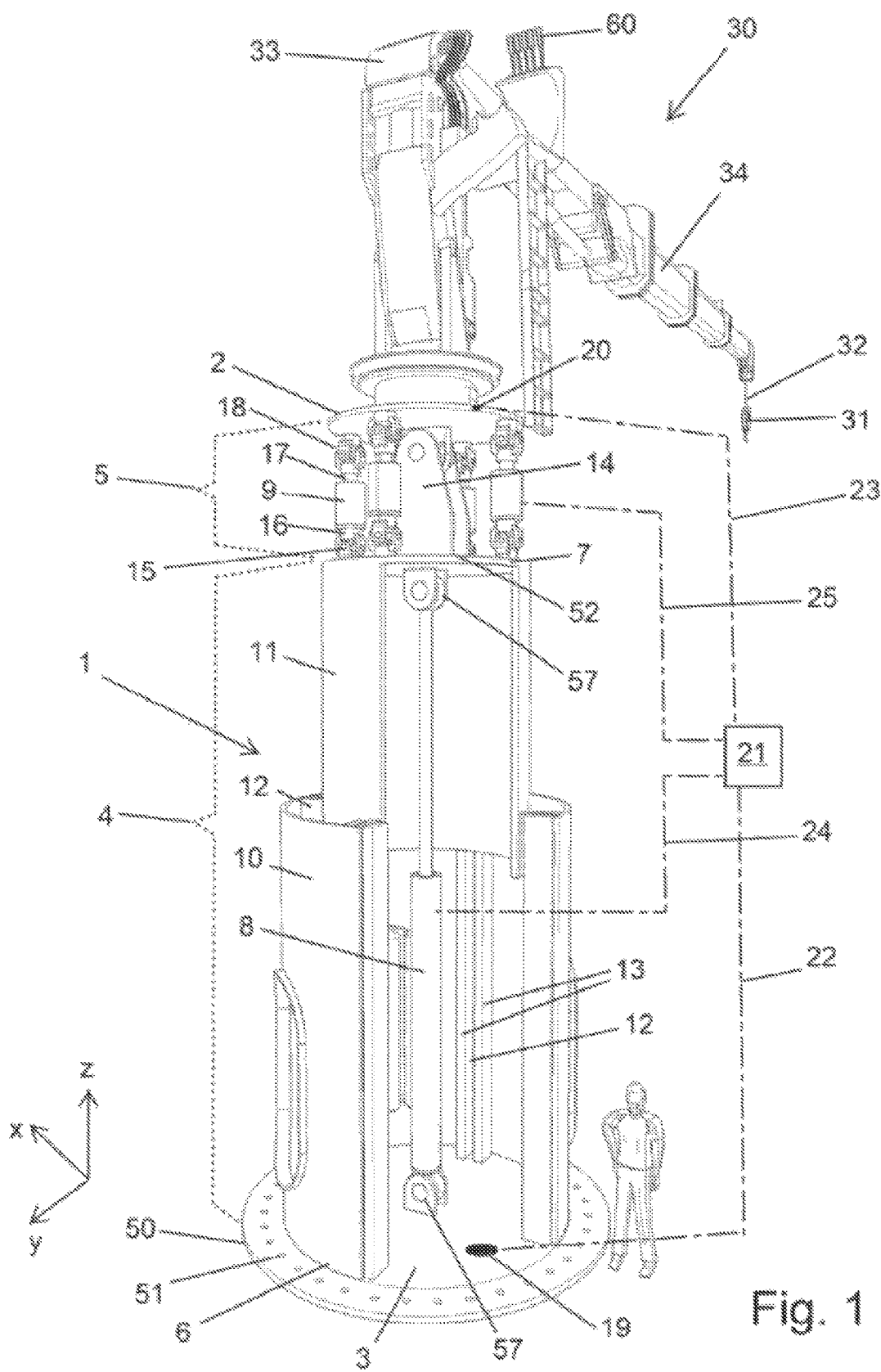
FIG. 1 shows, in perspective view, a device according to the invention.
Figure 2:
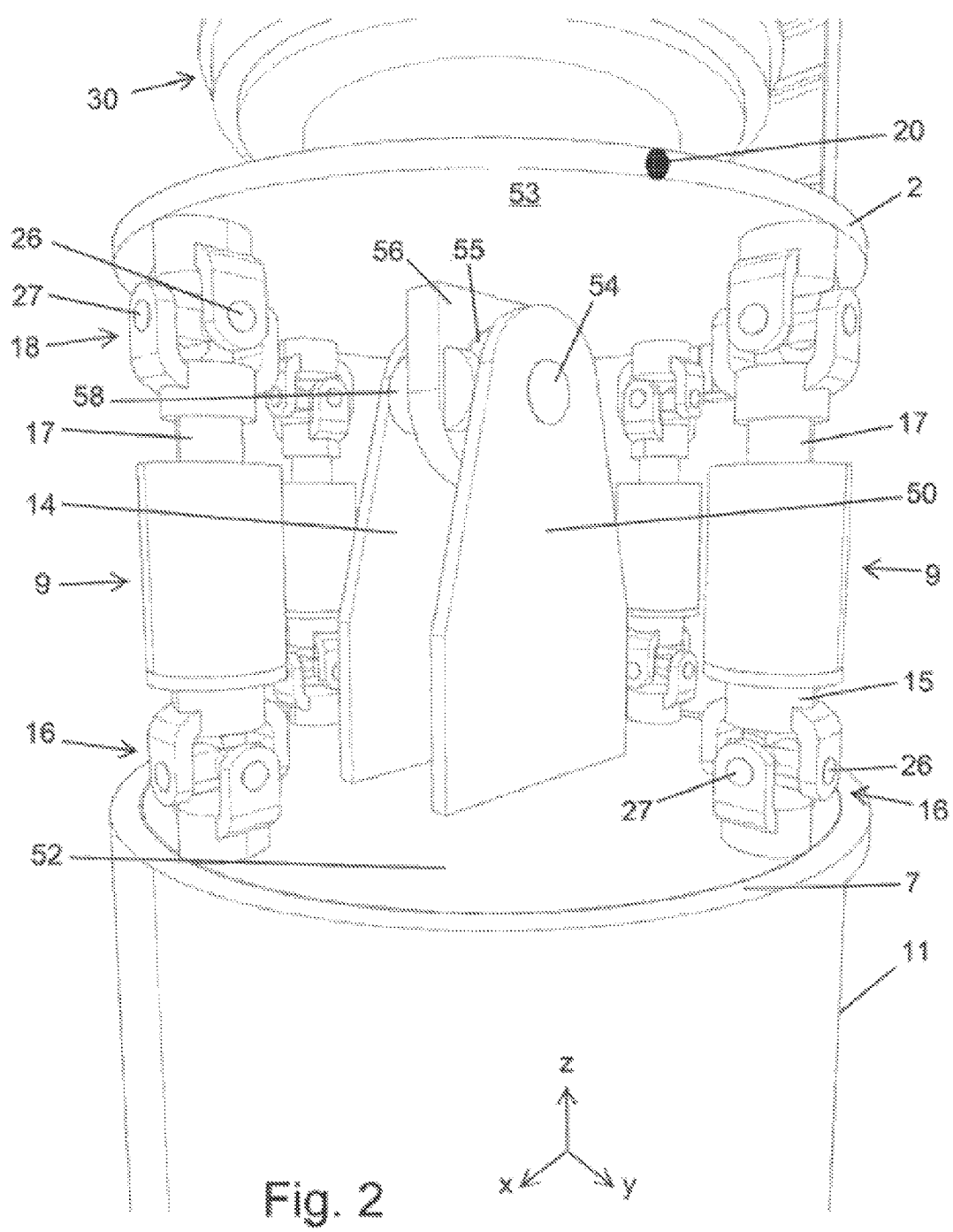
FIG. 2 is, in perspective view, a detail of the device of FIG. 1.
Figure 3:
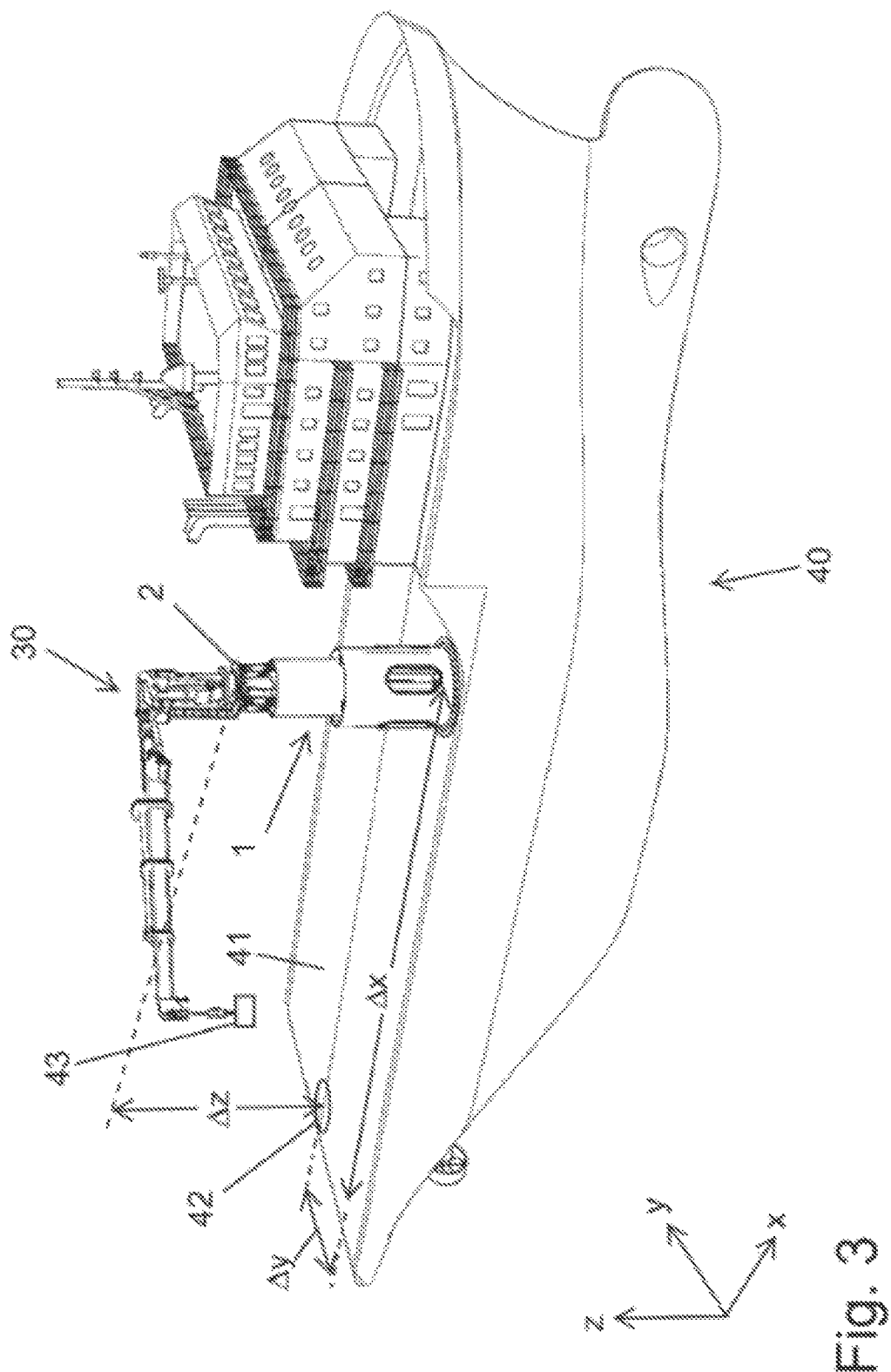
FIG. 3 shows, in perspective view, a vessel provided with the device of FIG. 1.

In the FIGS. 1-3, a Cartesian coordinate system having an x-axis x, y-axis y and z-axis z is represented to define the x-direction, y-direction and z-direction. An x-axis rotational movement is a movement having the x-axis as centre of rotation, an x-axis translational movement is a movement in a the direction of arrow x (or opposite direction). The same applies for the y-axis and z-axis.

FIG. 1 shows in perspective a motion compensation device 1 according to the invention.

This motion compensation device 1 has at its lower end a base 3. When mounted on a vessel 40, this base 3 is rigidly attached to the vessel 40, see FIG. 3. In this embodiment the base 3 has a circular flange 50 with a plurality of bolt passages 51. The base 3 determines the so called 'footprint' of the device 1 on the vessel. In the embodiment shown the footprint is circular with a diameter of about 385 cm. It is however to be noted that the footprint might have a different shape, like square, and that also the diameter of the footprint can have another size. For example a square footprint with a diameter of about 3 or 7 meter is conceivable as well. In case of a non-circular footprint, the diameter of the footprint is to be understood as the diameter of an imaginary circle enclosing the entire footprint.

At its upper side, the motion compensation device 1 is provided with a carrier frame 2. This carrier frame 2 is intended to support an object which is to be motion compensated. In the embodiment shown this object is a crane 30 having a telescopic boom 34, a hoisting cable 32, crane hook 31 and winch 33 for operating the cable. However, the carrier frame 2 can according to the invention also be used for supporting other objects, like just a winch, etcetera. Although the carrier frame 2 shown is essentially a plate, it will be clear that the carrier frame can have lots of other configurations as well.

Although, the carrier frame might have dimensions in the x- and y-direction which are larger than the dimensions of the footprint, the carrier has in the shown embodiment xy-dimensions smaller than the footprint. In the embodiment as shown, the entire motion compensation device has xy-dimensions within the footprint formed by the base.

The motion compensation device 1 has according to the invention a z-translation unit 4 and a xy-rotation unit 5.

The z-translation unit 4 has a first end 6, in this embodiment at the lower side, and a second end 7, in this embodiment at the upper side. The z-translation unit 4 comprises a first part 10 and a second part 11. This first 10 and second 11 part are mutually connected by a linear guide system 12 extending in the z-direction. This linear guide system 12, which may be formed by two parallel flanges 13 on one of the first and second part and an intermediate flange (not shown) on the other of the first and second part, is adapted to guide linear movement of the first and second part relative to each other in the z-direction. It will be clear that this linear guide system 12 can also be designed differently. In the embodiment shown, the first 10 and second part 11 are telescopic, tubular parts. Note however that the first 10 and second 11 parts neither must be telescopic neither tubular. The first and second part can also be designed differently. Functionally, the z-translation unit (in this embodiment especially the first and second part of the z-translation unit) is designed such that it allows only z-axis translational movement and prevents all other movements, i.e. x-axis translational movement, y-axis translational movement, z-axis rotational movement, x-axis rotational movement and y-axis rotational movement.

The z-translation unit 4 is further provided with at least one z-actuator 8. This z-actuator is designed to cause upon its actuation a z-axis translational movement of the carrier frame 2 with respect to the base 3. In the embodiment shown, the z-actuator is a hydraulic cylinder-piston unit 8. At its upper end and lower end the z-actuator is attached to the second part 11 and first part 10, respectively, by a hinge joint 57. These hinge joints prevent the z-actuator from being subjected to bending moments.

The xy-rotation unit 5 as shown in FIG. 1, is shown in more detail in FIG. 2.

The xy-rotation unit 5 has a proximal side 52 and a distal side 53. Proximal, in relation to the xy-rotation unit, means relatively close to the z-translation unit, whilst distal, in relation to the z-translation unit, means relatively remote from the z-translation unit.

The xy-rotation unit 5 comprises a main universal joint 14 (also called u-joint) extending from the proximal side 52 to the distal side 53. This universal joint is, in this embodiment, in the form of a ball joint. The ball joint 14 comprises a shaft 54 provided with a ball 55. This ball 55 is moveably received in a flange 56. The flange 56 is rigidly attached to the carrier frame 2. The shaft 54 is carried by two flanges 50, which in turn are rigidly attached to the upper end of the z-translation unit 4. As rotation of the joint 14 around the z-axis is prevented by the partly cylindrical blocks 58 (only two of these blocks can be seen in FIG. 2, but at the backside two further blocks 58 are provided) and the ball 55 is freely movable in the flange 56, this universal joint has two degrees of freedom, namely rotational freedom around two mutually perpendicular axes. It is to be noted that the main universal joint can also be designed differently, for example like a cardan joint similar to the cardan joints 16 and 18 (to be discussed below). This main universal joint 14 ensures that the xy-rotation unit allows x-axis rotational movement as well as y-axis rotational movement, on the one hand, and prevents z-axis rotational movement, x-axis translational movement, y-axis translational movement, and z-axis translational movement, on the other hand.

In order to be able to control the xy-rotational movement of the carrier frame 2 with respect to second end 7 of the z-translation unit—and accordingly also with respect to the base 3—, the xy-rotation unit is provided with at least two xy-actuators 9. In this embodiment there are four xy-actuators provided. In the embodiment shown, the xy-actuators are designed as linear, hydraulic actuators. Note however, that the xy-actuators can also be designed differently, for example using a spindle which is driven electrically.

The xy-actuators 9 each have a proximal end 15 and a distal end 17. At their proximal ends the xy-actuators are attached to the second end 7 of the z-translation unit 4 by a proximal universal joint 16. At their distal ends the xy-actuators are attached to the carrier frame 2 by a distal universal joint 18. In the embodiment as shown, the longitudinal direction of the xy-actuators 9 is, in the neutral position of the xy-actuators 9, parallel to the z-direction. It is however noted, that in the neutral position—in which the carrier frame is parallel to the base—the longitudinal direction of the xy-actuators might also slant with respect to the z-axis. Further it is to be noted that in the embodiment shown, the longitudinal direction of one or more of the xy-actuators will slant with respect to the z-axis when the carrier frame 2 and base 3 are not parallel. In the embodiment shown the distal and proximal universal joints are cardan joints with two orthogonal shafts 26 and 27. It is however to be noted that these universal joints can also be designed in different manner, for example as a ball joint like the main universal joint 14.

Upon actuation of one or more of the xy-actuators, the carrier frame 2 will rotate around the x-axis and/or y-axis with respect to the upper end 7 of the z-translation unit/with respect to the base 3.

In order to be able to control the movement of the carrier frame 2 with respect to the base 3, the motion compensation device 1 is according to the invention provided with a sensor system and a control system.

The sensor system comprises a sensor 19 for sensing the movements of the base. In addition to sensor 19 or as alternative for sensor 19, the sensor system might further comprise a sensor 20 for sensing the movements of the carrier frame.

As the base 19 will be rigidly attached to a vessel 40, the sensor 19 thus senses the movements of the vessel when the motion compensation device 1 has been mounted on a vessel 40.

Although for the present invention the sensors 19 and 20 only need to be able to sense z-translational movement, x-rotational movement and y-rotational movement, it will in practise be practical to use sensors which are capable of sensing also the x-translational movement, y-translational movement and z-rotational movement. This simply because such sensors are commonly available on the market as standard sensor. In practise, most sensors sense in fact the acceleration in x-translational direction, y-translational direction, in z-translational direction, in x-rotational direction, in y-rotational direction and in z-rotational direction. Knowing these accelerations, the corresponding velocities and displacements can easily be calculated/determined by software.

The sensors 19 and 20 will generate sensor signals representing the sensed movements. These sensor signals are be transferred wireless or by wire to a control system 21 as is indicated in FIG. 1 with sensor lines 22 and 23. In response to these sensor signals, the control system 21 will generate one or more control signals for driving the z-actuator and/or one or more of the xy-actuators. These control signals are transferred wireless or by wire to the z-actuator and xy-actuators as is indicated in FIG. 1 with control lines 24 and 25. In addition also sensors can be used to sense the movements of the carrier frame and/or at least one z-actuator and/or at least two xy-actuators to provide corresponding sensor signals used as feedback by the control system 21 to increase the accuracy of the control.

In order to keep an object placed on the carrier frame still relative to the fixed world whilst the vessel below it is moving with respect to the fixed world, the control system will be arranged to neutralize all z-translations and x- and y-rotations of the vessel.

The motion compensation device according to this 'independent control embodiment' of the invention allows the z-translation compensation to be essentially independent from the xy-rotation compensation. This simplifies the control algorithms used by the control system and allows increase in accuracy.

Referring to FIG. 3, the on board control mode is elucidated. In FIG. 3, reference number 42 indicates a target location on deck of the vessel, reference number 43 indicates a load carried by the hook of the crane 30, reference $\Delta z$ indicates the vertical distance between the carrier frame 2 and target location 42, reference $\Delta x$ indicates the horizontal distance in the x-direction between the centre of the base 3 and the centre of the target location 42, and reference $\Delta x$ indicates the horizontal distance in the y-direction of between the centre of the base 3 and the centre of the target location 42.

First the situation without applying the invention is explained. In case the vessel 40 is subjected to clock wise pitch (rotation around the y-axis in clock wise direction), the target location will move downward (opposite to z-arrow). In case the carrier frame 2 is maintained stationary with respect to the fixed world, this means that when the crane is just at the moment of releasing the load on the deck 41 of the vessel, the deck moves away from the load 43 so that the load is not softly landed on the deck but dropped on the deck. In case of a counter clock wise pitch of the vessel, the deck would be forced to hit the load, also preventing a soft landing. Similar applies for the vessel being subjected to roll.

When applying the invention, the carrier frame 2 will—in the on board control mode—move in z-direction simultaneously with the moving of the target location 42 due to pitch or roll. In the on board control mode, the carrier frame 2 follows so to say the vertical movement of the target location 42. In case of precise following, the vertical distance d between the carrier frame and target location will be maintained at a constant value. The control system can achieve this 'maintaining the $\Delta z$ at a content value' in the on board control mode with a relatively simple control algorithm on the basis of the following:

- the horizontal coordinates of the target location with respect to the carrier frame, i.e. the values $\Delta x$ and $\Delta y$;
- the location of the motion compensation device with respect to the vessel;
- the x-rotational motion of the base 3 (which is the same as the x-rotational motion of the vessel) with respect to the fixed world and the y-rotational motion of the base (which is the same as the y-rotational motion of the vessel) with respect to the fixed world.

In order to allow switching between the on board control mode and the outboard control mode, a manual switch 60 might be provided (FIG. 1) so that the operator can switch between the two modes.

List of references to figures

| | |
|---|---|
| 1 | motion compensation device |
| 2 | carrier frame |
| 3 | base |
| 4 | z-translation unit |
| 5 | xy-rotation unit |
| 6 | first end of z-translation unit |
| 7 | second end of z-translation unit |
| 8 | z-actuator |
| 9 | xy-actuator |
| 10 | first part of z-translation unit |
| 11 | second part of z-translation unit |
| 12 | linear guide system |
| 13 | parallel flanges |
| 14 | main universal joint |
| 15 | proximal end of xy-actuator |
| 16 | proximal universal joint |
| 17 | distal end of xy-actuator |
| 18 | distal universal joint |
| 19 | sensor for sensing base movements |
| 20 | sensor for sensing carrier frame movements |
| 21 | control system |
| 22 | sensor signal line |
| 23 | sensor signal line |
| 24 | control line |
| 25 | control line |
| 26 | first axis of proximal/distal u-joint |
| 27 | second axis of proximal/distal u-joint |
| 30 | crane |
| 31 | crane hook |
| 32 | hoisting cable |
| 33 | winch |
| 34 | boom |
| 40 | vessel |
| 41 | deck |
| 42 | target location |
| 43 | load |
| 50 | flange |
| 51 | bolt passage |
| 52 | proximal side of xy-rotation unit |
| 53 | distal side of xy-rotation unit |
| 54 | shaft |
| 55 | ball |
| 56 | flange |
| 57 | hinge joint |
| 58 | block |
| 60 | switch for on board/outboard |
| x | x-axis |
| y | y-axis |

-continued

List of references to figures

| z | z-axis |
|---|---|
| Δx | distance in x-direction between the target location and the base |
| Δy | distance in y-direction between the target location and the base |
| Δz | vertical distance between the target location and the carrier frame |

The invention claimed is:

1. A motion compensation device for compensating a load manipulator, such as a crane, on a vessel for water motion;
wherein an imaginary set of three orthogonal axes is defined by an x-axis, a y-axis and a z-axis, the z-axis extending vertically when the device is in use;
wherein the device comprises:
a carrier frame for carrying the manipulator;
a base for supporting the motion compensation device on the vessel;
an actuator system adapted to cause upon actuation of the actuator system one or more of the following movements:
translation of the carrier frame with respect to the base along the z-axis;
rotation of the carrier frame with respect to the base around the x-axis;
rotation of the carrier frame with respect to the base around the y-axis;
a sensor system arranged for sensing at least x-axis rotational movement and y-axis rotational movement of the vessel and generating sensor signals representing said sensed movements of the vessel;
a control system generating one or more control signals driving the actuator system in response to said sensor signals;
wherein the control system comprises an outboard control mode for outboard load manipulation;
wherein, in the outboard control mode, the control system is arranged to generate one or more control signals for driving the actuator system such that the carrier frame is compensated for x-axis rotational movement, y-axis rotational movement and z-axis translational movement of the vessel;
wherein the control system further comprises on board control mode for on board load manipulation;
wherein, in the on board control mode, the control system is arranged to generate one or more control signals for driving the actuator system such that the carrier frame is compensated for x-axis rotational movement and y-axis rotational movement of the vessel, and follows, viewed in vertical direction, the vertical movement of a target location on the vessel; and
wherein, in the on board control mode, the one or more control signals for driving the actuator system are such that the vertical distance between the target location and carrier frame is maintained at a constant value.

2. The motion compensation device according to claim 1, wherein the compensation of the carrier frame for x-axis rotational movement and y-axis rotational movement of the vessel is, in the outboard control mode and/or on board control mode, such that the carrier frame is maintained in horizontal position.

3. The motion compensation device according to claim 1, comprising a switch connected with the control system for switching the control system between the outboard control mode and on board control mode.

4. The motion compensation device according to claim 3, wherein the control system further comprises a transition mode in which the control system switches smoothly between the on board control mode and the outboard control mode.

5. The motion compensation device according to claim 1, wherein the control system further comprises a transition mode in which the control system switches smoothly between the on board control mode and the outboard control mode.

6. The motion compensation device according to claim 1, wherein the device further comprises a sensor arranged to sense the position of the gripper and to transfer a signal corresponding with the sensed position to the control system, wherein the control system is adapted to:
switch from the outboard control mode to the on board control mode when the gripper comes within a predefined area around the vessel;
switch from the on board control mode to the out board control mode when the gripper leaves a predefined area around the vessel.

7. The motion compensation device according to claim 1, comprising an input device arranged for receiving coordinates of the target location and transferring these coordinates to the control system.

8. The motion compensation device according to claim 1, wherein the device comprises a mechanical constraining system restricting x-axis translational movement, y-axis translational movement and z-axis rotational movement of the carrier frame with respect to the base.

9. The motion compensation device according to claim 1, wherein the device further comprises:
a z-translation unit; and
a xy-rotation unit;
wherein the z-translation unit allows z-axis translational movement and prevents x-axis translational movement, y-axis translational movement, z-axis rotational movement, x-axis rotational movement and y-axis rotational movement;
wherein the z-translation unit has, viewed in the direction of the z-axis, a first end and a second end;
wherein the xy-rotation unit allows x-axis rotational movement as well as y-axis rotational movement and prevents z-axis rotational movement, x-axis translational movement, y-axis translational movement, and z-axis translational movement;
wherein the base is provided at the first end of the z-translation unit and the carrier frame at the second end of the z-translation unit with the xy-rotation unit being arranged between
the z-translation unit and the carrier frame;
or
the z-translation unit and the base;
wherein the actuator system comprises:
at least one z-actuator provided in the z-translation unit and arranged to cause, upon actuation of said z-actuator, z-axis translational movement of the carrier frame with respect to the base; and
at least two xy-actuators provided in the xy-rotation unit and arranged to cause, upon actuation of one or more of said xy-actuators, x-axis rotational and/or y-axis rotational movement of the carrier frame with respect to the base; and
wherein the at least one z-actuator and at least two xy-actuators are different actuators.

10. An assembly comprising:
a device according to claim 1; and
a crane.

11. The assembly according to claim 10, further comprising a vessel.

12. An assembly comprising:
a device according to claim 1; and
a vessel.

13. The motion compensation device according to claim 1, wherein the motion compensation device has more than 3 degrees of freedom.

14. A method for transferring a load between a target position on board a vessel and an outboard position outboard said vessel; which method comprises the steps of:
providing a vessel, a motion compensation device and a crane; the motion compensation device being arranged on board the vessel; the motion compensation device comprising a carrier frame, a base and an actuator system for moving the carrier frame with respect to the base; the base being fixed to the vessel; and the crane being carried by the carrier frame;
transferring a load with the crane;
driving, during picking up a load from the vessel or placing a load on the vessel, the actuator system in an on board mode such: that the carrier frame is being compensated for x-axis rotational movement and y-axis rotational movement of the vessel, that the carrier frame follows, viewed in vertical direction, the vertical movement of the target location, and that the vertical distance between the target location and carrier frame is maintained at a constant value;
driving, during picking up a load from the outboard position or placing a load on the outboard position, the actuator system in an out board mode such that the carrier frame is being compensated for x-axis rotational movement, y-axis rotational movement and z-axis translational movement of the vessel.

15. The method according to claim 14, further comprising:
driving, during picking up a load from the vessel or placing a load on the vessel as well as during picking up a load from the outboard position or placing a load on the outboard position, the actuator system in such a manner that the carrier frame is maintained in horizontal position.

16. The method according to claim 14, further comprising:
switching, during transfer of the load between the target position on board to the vessel and the outboard position, the mode of driving the actuator system:
from the on board mode to the outboard mode in case the transfer is towards the outboard position; or
from the outboard mode to the on board mode in case the transfer is towards the target position.

17. The method according to claim 13, further comprising:
driving the motion compensation device to switch gradually between the on board control mode and the outboard control mode.

18. The method according to claim 13, further comprising:
driving the motion compensation device to:
switch from the outboard control mode to the on board control mode when the gripper comes within a predefined area around the vessel; and
switch from the on board control mode to the out board control mode when the gripper leaves a predefined area around the vessel.

19. A motion compensation device for compensating a load manipulator, such as a crane, on a vessel for water motion;
wherein an imaginary set of three orthogonal axes is defined by an x-axis, a y-axis and a z-axis, the z-axis extending vertically when the device is in use;
wherein the device comprises:
a carrier frame for carrying the manipulator;
a base for supporting the motion compensation device on the vessel;
an actuator system adapted to cause upon actuation of the actuator system one or more of the following movements:
translation of the carrier frame with respect to the base along the z-axis;
rotation of the carrier frame with respect to the base around the x-axis;
rotation of the carrier frame with respect to the base around the y-axis;
a sensor system arranged for sensing at least x-axis rotational movement and y-axis rotational movement of the vessel and generating sensor signals representing said sensed movements of the vessel;
a control system generating one or more control signals driving the actuator system in response to said sensor signals;
wherein the control system comprises an outboard control mode for outboard load manipulation;
wherein, in the outboard control mode, the control system is arranged to generate one or more control signals for driving the actuator system such that the carrier frame is compensated for x-axis rotational movement, y-axis rotational movement and z-axis translational movement of the vessel;
wherein the control system further comprises on board control mode for on board load manipulation;
wherein, in the on board control mode, the control system is arranged to generate one or more control signals for driving the actuator system such that the carrier frame is compensated for x-axis rotational movement and y-axis rotational movement of the vessel, and follows, viewed in vertical direction, the vertical movement of a target location on the vessel; and
wherein the device further comprises a sensor arranged to sense the position of the gripper and to transfer a signal corresponding with the sensed position to the control system, wherein the control system is adapted to:
switch from the outboard control mode to the on board control mode when the gripper comes within a predefined area around the vessel;
switch from the on board control mode to the out board control mode when the gripper leaves a predefined area around the vessel.

* * * * *